(12) United States Patent
Kutsuwada et al.

(10) Patent No.: US 6,542,257 B2
(45) Date of Patent: Apr. 1, 2003

(54) IMAGE FORMATION APPARATUS WHICH FORMS IMAGES OF FOUR PAGES ON BOTH FACES OF SHEET IN SUCH A MANNER AS IMAGES OF TWO PAGES ARE FORMED ON EACH FACE

(75) Inventors: Satoru Kutsuwada, Yokohama (JP); Keiju Kuboki, Yokohama (JP); Satoshi Kaneko, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/012,390

(22) Filed: Dec. 12, 2001

(65) Prior Publication Data

US 2002/0041405 A1 Apr. 11, 2002

Related U.S. Application Data

(62) Division of application No. 09/119,043, filed on Jul. 20, 1998, now abandoned.

(30) Foreign Application Priority Data

Jul. 23, 1997 (JP) .............................................. 9-211232

(51) Int. Cl.[7] .............................................. G06F 15/00
(52) U.S. Cl. ...................... 358/1.18; 358/296; 358/453; 358/450; 358/452; 399/38; 399/187; 399/199
(58) Field of Search ............................... 358/1.18, 296, 358/453, 450, 452; 399/38, 187, 199

(56) References Cited

U.S. PATENT DOCUMENTS

| 5,530,560 A | 6/1996 | Nakajima .................... 358/453 |
| 5,617,196 A | 4/1997 | Ueda et al. .................. 399/379 |
| 5,839,033 A | 11/1998 | Takahashi et al. .......... 399/187 |

*Primary Examiner*—Mark Wallerson
*Assistant Examiner*—Twyler Lamb
(74) *Attorney, Agent, or Firm*—Fitzpatrick, Cella, Harper & Scinto

(57) ABSTRACT

An image formation apparatus that loads a sheaf of originals obtained by stacking a sheaf of the originals to be copied and a sheaf of originals for front and reverse cover sheets, feeds the originals one by one from the loaded sheaf, reads the fed original and stores a read original image, reading the original images of four pages form the storage and forms the images of two pages on each of front and reverse faces of a sheet. Controlling the reading such that the original image for the cover sheet is formed on the sheet different from the sheet not for the cover sheet and such that plural sheets on which the images have been respectively formed are folded in two while being stacked.

11 Claims, 18 Drawing Sheets

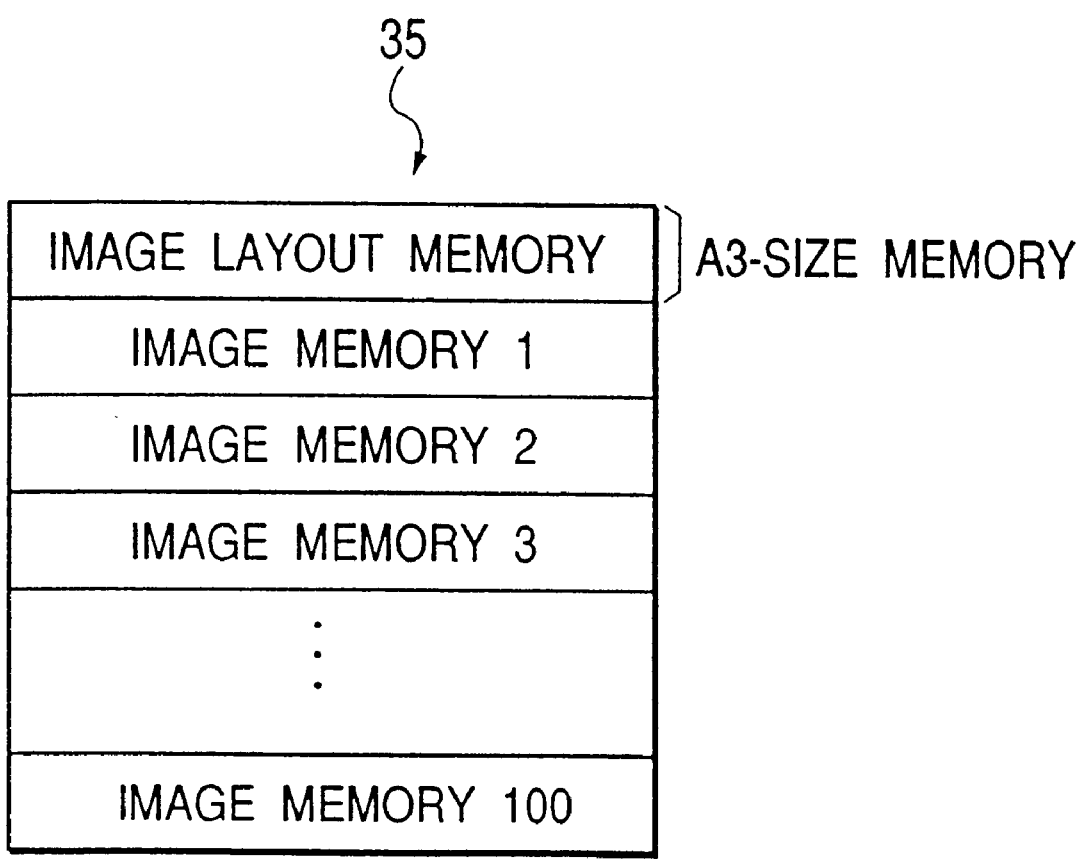

FIG. 8A
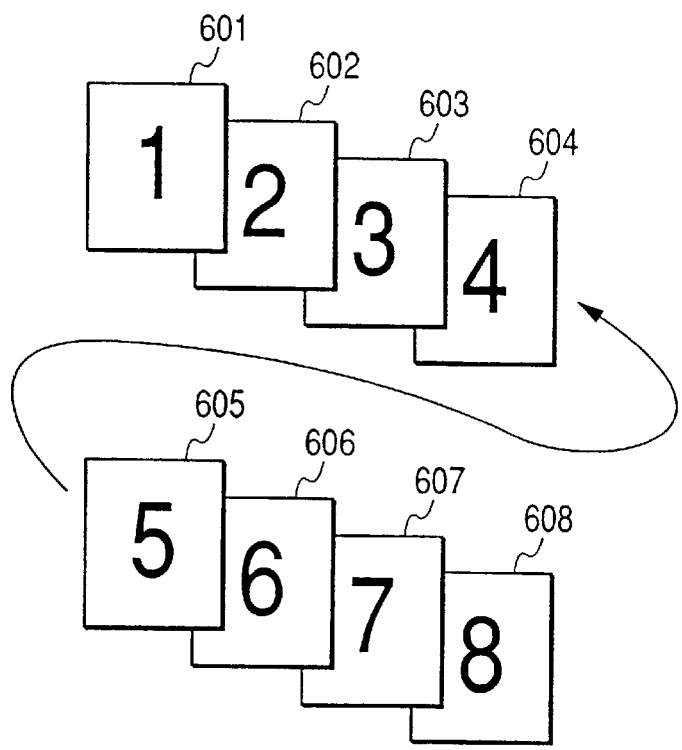
FIG. 8B
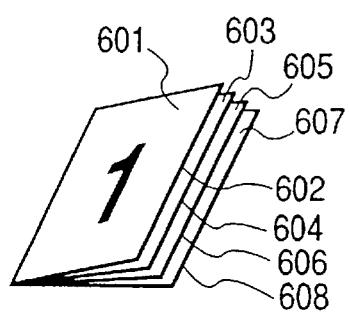
FIG. 8C
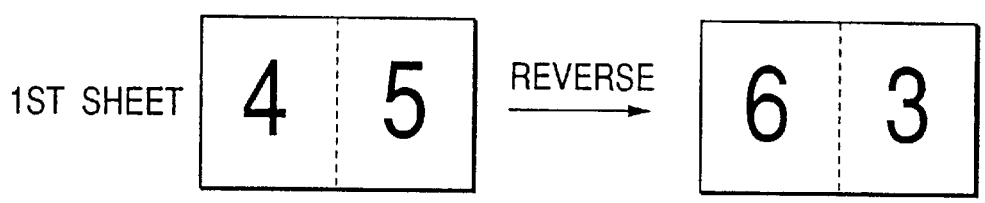
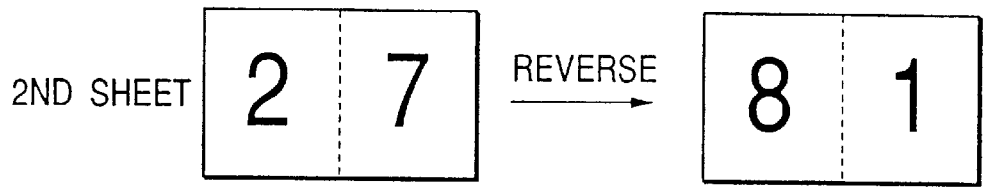

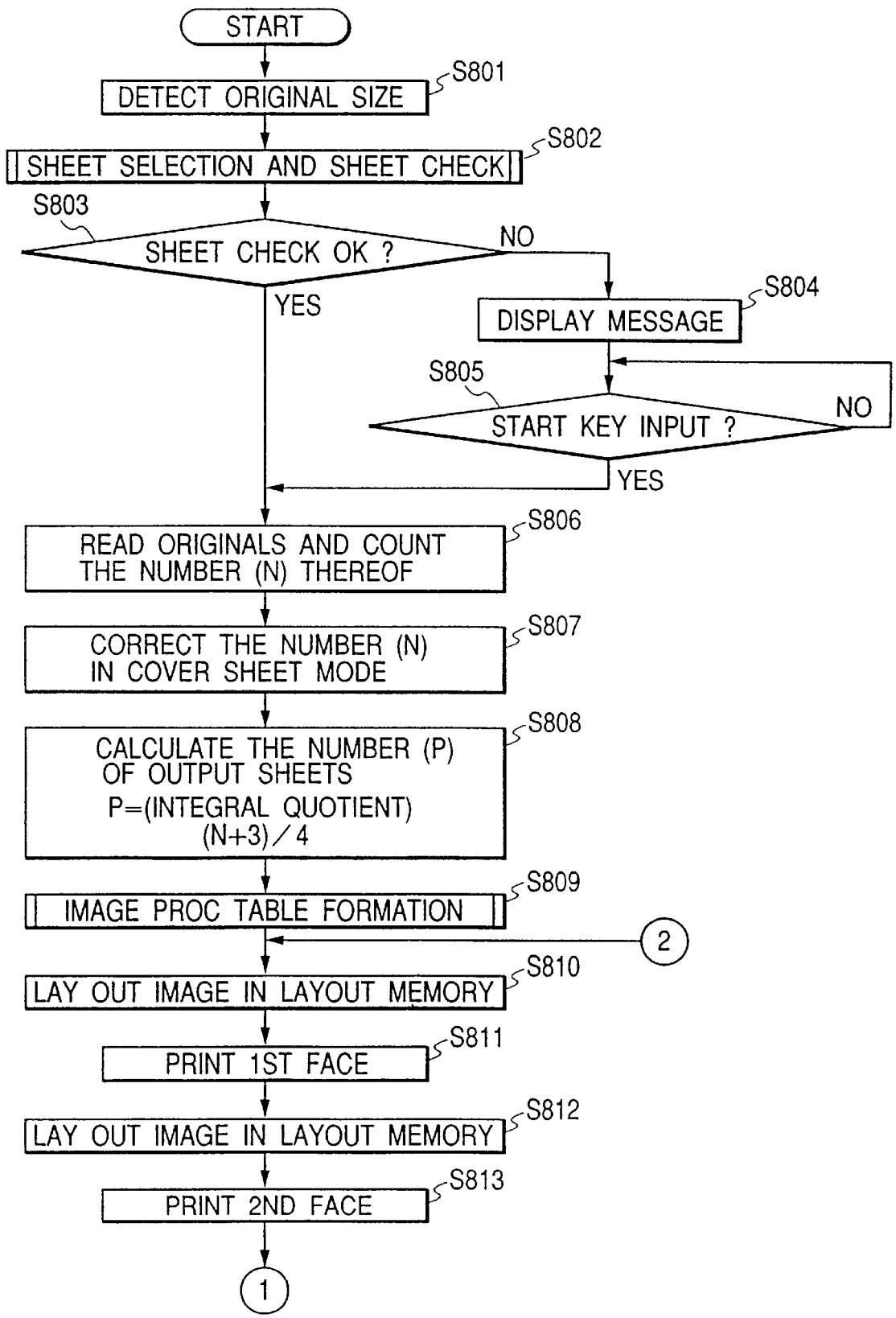

FIG. 13A

|  | LONGITUDINAL SIZE | LATERAL SIZE |
|---|---|---|
| A5 LATERAL | 148 | 210 |
| B5 LATERAL | 182 | 257 |
| A4 LATERAL | 210 | 297 |
| B4 LATERAL | 257 | 364 |
| A3 LATERAL | 297 | 420 |

FIG. 13B

|  | LONGITUDINAL SIZE | LATERAL SIZE |
|---|---|---|
| A5 LONGITUDINAL | 210 | 148 |
| A5 LATERAL | 148 | 210 |
| B5 LONGITUDINAL | 257 | 182 |
| B5 LATERAL | 182 | 257 |
| A4 LONGITUDINAL | 297 | 210 |
| A4 LATERAL | 210 | 297 |
| B4 LATERAL | 257 | 364 |
| A3 LATERAL | 297 | 420 |

FIG. 16A

NO COVER SHEET OR NO COPY ON COVER SHEET

|  | 1ST FACE: LEFT | 1ST FACE: RIGHT | 2ND FACE: LEFT | 2ND FACE: RIGHT |
|---|---|---|---|---|
| 1ST SHEET | 4 | 5 | 6 | 3 |
| 2ND SHEET | 2 | 7 | 8 | 1 |
| ⋮ | | | | |
| (n-1)TH SHEET | | | | |
| nTH SHEET | | | | |

FIG. 16B

COPY (OF ORIGINAL 3 PAGES) ON COVER SHEET

|  | 1ST FACE: LEFT | 1ST FACE: RIGHT | 2ND FACE: LEFT | 2ND FACE: RIGHT |
|---|---|---|---|---|
| 1ST SHEET | 7 | 8 | 9 | 6 |
| 2ND SHEET | 5 | 10 | 11 | 4 |
| ⋮ | | | | |
| (n-1)TH SHEET | | | | |
| nTH SHEET | | | | |

FIG. 18A

| | REVERSE-INSIDE COVER SHEET | REVERSE COVER SHEET | FRONT-INSIDE COVER SHEET | FRONT COVER SHEET |
|---|---|---|---|---|
| 0 | — | — | — | — |
| 1 | — | — | — | O |
| 2 | — | — | O | — |
| 3 | — | — | O | O |
| 4 | — | O | — | — |
| 5 | — | O | — | O |
| 6 | — | O | O | — |
| 7 | — | O | O | O |
| 8 | O | — | — | — |
| 9 | O | — | — | O |
| 10 | O | — | O | — |
| 11 | O | — | O | O |
| 12 | O | O | — | — |
| 13 | O | O | — | O |
| 14 | O | O | O | — |
| 15 | O | O | O | O |

FIG. 18B

| REVERSE-INSIDE COVER SHEET 1ST FACE: RIGHT | FRONT-INSIDE COVER SHEET 1ST FACE: LEFT | FRONT COVER SHEET 2ND FACE: RIGHT | REVERSE COVER SHEET 2ND FACE: LEFT |
|---|---|---|---|
| 0 | 0 | 0 | 0 |
| 0 | 0 | 1 | 0 |
| 0 | 1 | 0 | 0 |
| 0 | 2 | 1 | 0 |
| 0 | 0 | 0 | 1 |
| 0 | 1 | 1 | 2 |
| 0 | 2 | 0 | 2 |
| 1 | 0 | 1 | 3 |
| 2 | 0 | 0 | 0 |
| 2 | 1 | 1 | 0 |
| 3 | 2 | 0 | 0 |
| 2 | 0 | 1 | 1 |
| 3 | 1 | 0 | 2 |
| 3 | 2 | 1 | 2 |
| 4 | 2 | 1 | 3 |

IMAGE FORMATION APPARATUS WHICH FORMS IMAGES OF FOUR PAGES ON BOTH FACES OF SHEET IN SUCH A MANNER AS IMAGES OF TWO PAGES ARE FORMED ON EACH FACE

This is a divisional application of U.S. patent application Ser. No. 09/119,043 file Jul. 20, 1998, now abandoned.

BACKGROUND OF THE INVENTION

1. Field of the Invention

The present invention relates to an image formation apparatus which forms images of four pages on front and reverse faces (or sides) of a sheet as the images of the two pages are formed on each face.

2. Related Background Art

Recently, there has been proposed an image formation apparatus which forms images of two pages on each of front and reverse faces of a sheet. In this apparatus, in a state that the plural sheets each taking the images on its front and reverse faces are being stacked, these stacked sheets are together folded in two and then bound at their folds to put the images formed on the sheets in the order of page.

However, in a case where it is intended to obtain these sheets together with a cover sheet, there has been a problem that, if an original to be formed or copied on the cover sheet is merely put on plural originals to be formed or copied on the sheets other than the cover sheet the same as the originals are ordinarily put or set, the image of the original which is to be formed or copied essentially on the sheet other than the cover sheet is undesirably formed or copied on the reverse of the cover sheet. Therefore, in order that any image may not be formed on the reverse of the cover sheet, it is necessary to modify a copy operation by appropriately inserting a blank sheet in a sheaf of the originals, whereby the operation becomes troublesome.

SUMMARY OF THE INVENTION

An object of the present invention is to provide an image formation apparatus which can solve the above-described conventional problem.

An another object of the present invention is to provide an image formation apparatus, an image formation method and a storage medium in which a computer readable program to realize the above method is stored, all capable of judging based on a set operation mode whether or not a read original image is the image to be printed on a cover sheet or the image to be printed on a recording sheet other than the cover sheet, and easily obtaining copies laid out into a book binding state added with the cover sheet.

Further objects and features of the present invention will be apparent from the following detailed description and the accompanying drawings.

BRIEF DESCRIPTION OF THE DRAWINGS

FIG. 7 is a view showing image storage areas in an image memory 35;

FIGS. 8A, 8B and 8C are views showing a copy process in a book binding mode;

FIG. 9 is a flow chart showing the procedure of the copy process when the book binding mode and the cover sheet mode are designated;

FIGS. 13A and 13B are views showing tables used to search or retrieve an optimum sheet size;

FIGS. 16A and 16B are views showing the image process tables;

FIGS. 18A and 18B are views showing a cover sheet image process table.

DETAILED DESCRIPTION OF THE PREFERRED EMBODIMENT

Figure 1:
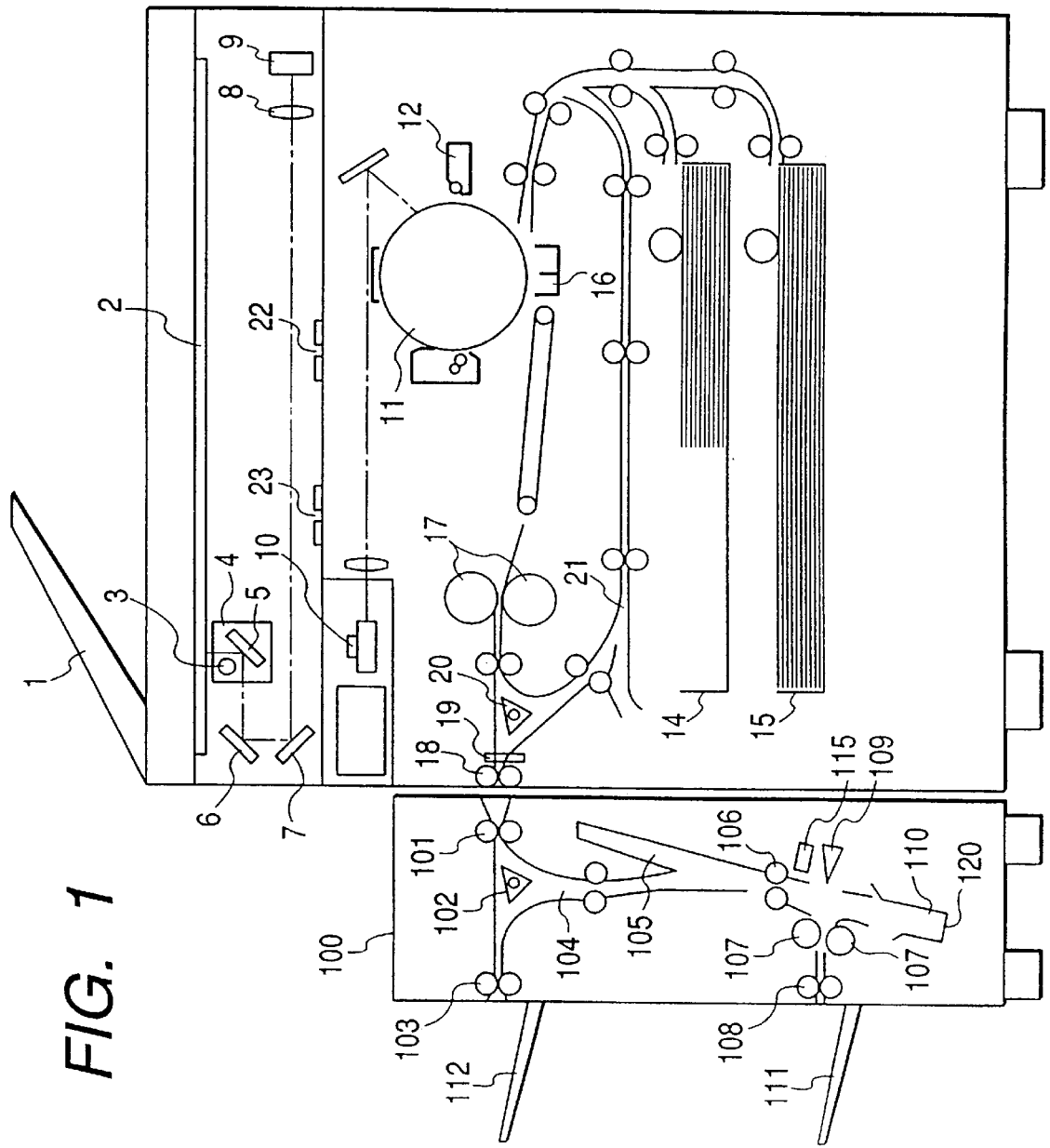
FIG. 1 is a sectional view showing the structure of a copy machine in an embodiment of the present invention.

An embodiment of an image formation apparatus, an image formation method and a storage medium in which a computer readable program to realize the above method is stored, according to the present invention will be explained hereinafter. In the present embodiment, the image formation apparatus is applied to a copy machine, and FIG. 1 is a sectional view showing the structure of the copy machine.

In the drawing, a sheaf of originals is put upward on an original feed unit 1, and the originals are sequentially carried or fed to an original mounting glass board 2 one by one. At this time, a size of the carried original is detected by an original size detection sensor (not shown) provided within the unit 1. Also, in case of directly setting the original on the glass board 2, the size of the original can be detected by reflection sensors 22 and 23.

After the original was carried to or put on the glass board 2, a lamp 3 is turned on and a scanner unit 4 is moved to irradiate the original. Light reflected from the original is penetrated to a lens 8 through mirrors 5, 6 and 7, and then inputted to an image sensor 9. An original image inputted to the sensor 9 is processed by a CPU circuit unit 37 (see FIG. 3). Then, the processed image is directly inputted to an exposure control unit 10, or once stored in an image memory 35 (see FIG. 3) and then read out thereof and inputted to the control unit 10.

An image signal inputted to the control unit 10 is converted into an optical signal. The obtained optical signal is modulated according to the image signal and then irradiated onto a photosensitive body 11. An electrostatic latent image formed on the photosensitive body 11 based on this irradiation is developed by a development unit 12.

On the other hand, in synchronism with developing timing, a transfer sheet is carried from a transfer sheet loading unit 14 or 15, and a developed toner image is transferred to the transfer sheet by a transfer unit 16. The transferred toner image is fixed to the sheet by a fixing unit 17. After then, in case of discharging the transfer sheet of a single-face image, such the sheet is discharged outside from a sheet discharge unit 18. On the other hand, in case of discharging the transfer sheet of double-face images or multiplex images, such the sheet is passed through a double-face/multiplex path 21 by a flapper 20 and then again carried to the transfer unit 16.

The transfer sheet outputted from the sheet discharge unit 18 is carried to a sheet discharge process unit 100. In the unit 100, by using a flapper 102, the carried sheet is discharged to a sheet discharge tray 112 or carried to a folding path 104. In the folding path 104, a first face of the transfer sheet of the double-face images faces the right (i.e., folding unit 109 side), and a second face thereof faces the left.

Figure 2:
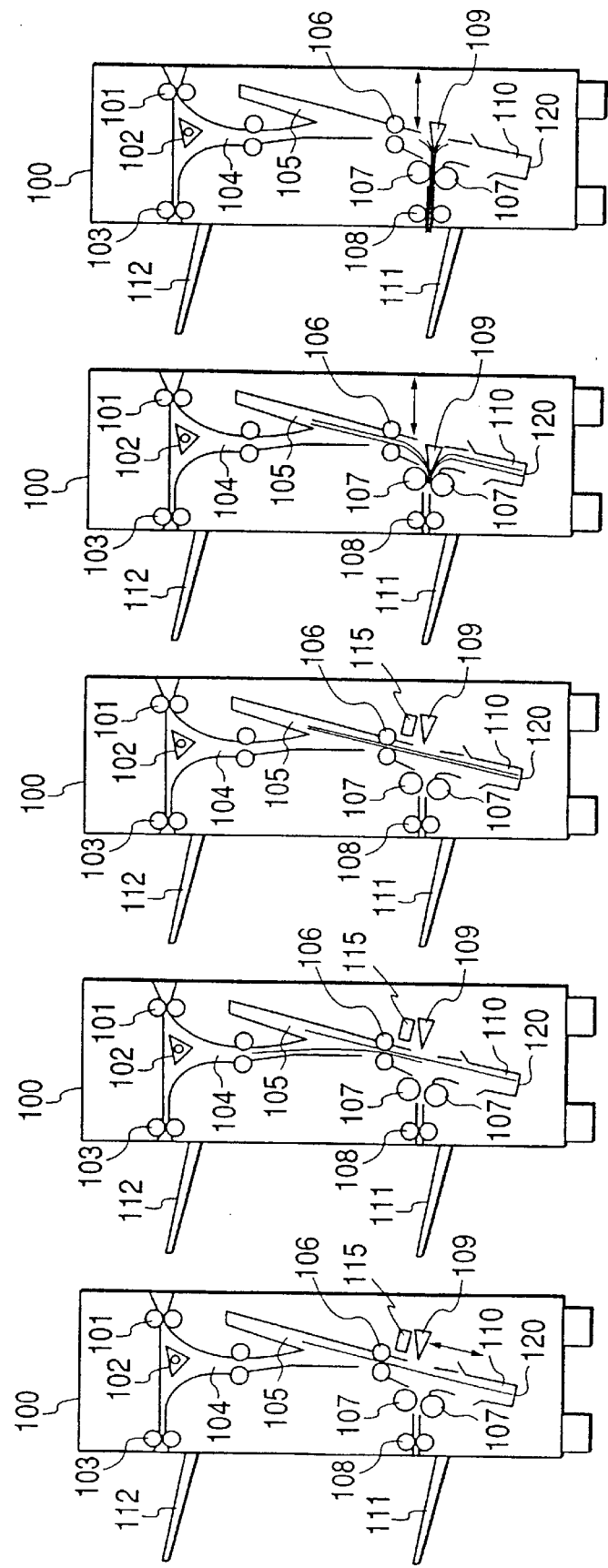
FIGS. 2A, 2B, 2C, 2D and 2E are views showing the procedure of a folding process.

FIGS. 2A to 2E are views showing the procedure of a folding process. The sheet carried to the folding path 104 is further carried up to a butting board 120 (FIG. 2A). By once lowering and then raising the butting board 120 up to a predetermined position, a trailing edge of the sheet is entered into a refuge path 105, and the sheet discharge process unit 100 waits for the next (i.e., second) sheet carried (FIG. 2B). Similarly, the second sheet is set in the refuge path 105 (FIG. 2C). After all the sheets were carried to the path 105, the butting board 120 is raised such that a central portion of the sheets reaches the position of a stapler 115, and a stapling process on the sheets is performed by the stapler 115. The butting board 120 is then lowered such that the central portion of the sheets set at the board 120 reaches the position of the folding unit 109 (FIG. 2D). By moving the folding unit 109 in the direction of folding rollers 107, the central portion of the sheets is entered between the rollers 107, whereby the stacked sheets are together folded in two and then discharged to a sheet discharge tray 111 (FIG. 2E). In other words, the first face of the sheet of the double-face images is discharged in a state that the first face is being folded inward.

The sheet discharge process unit 100 is detachable from the main body of the copy machine, and a sensor (not shown) to detect the unit 100 is provided within the main body.

Figure 3:
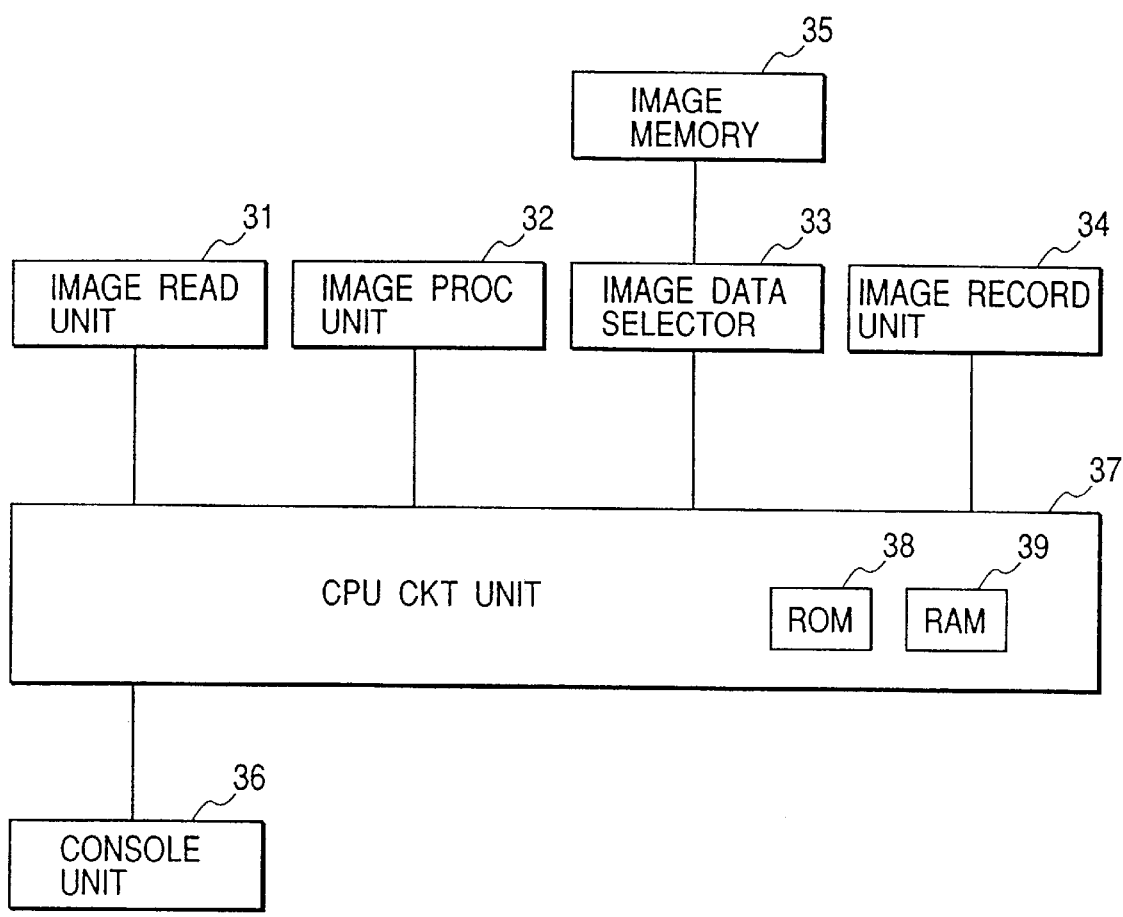
FIG. 3 is a block diagram showing the structure of a control unit of the copy machine.

FIG. 3 is a block diagram showing the structure of a control unit of the copy machine. In the drawing, an image read unit 31 is composed of an optical system for inputting the reflected light from the original image, a CCD for converting the reflected light from the optical system into an analog signal, an A/D converter for converting the analog signal received from the CCD into a digital signal, and the like. The image read unit 31 reads the original image and sends the obtained digital signal to an image process unit 32.

The image process unit 32 is composed of a shading correction circuit, a light color density conversion circuit, an image edit circuit and the like. The image edit circuit edits the image, e.g., zooming, shifting and trimming of the image, on the basis of an instruction from a user. The image process unit 32 corrects and edits the image inputted from the image read unit 31, and then sends obtained image data to an image record unit 34 or the image memory 35 to store the image through an image data selector 33.

The image data selector 33 is composed of a switching circuit unit, a synthesizing circuit unit and the like. The switching circuit unit switches a path for sending the image data from the image process unit 32 to the image record unit 34, a path for sending the image data from the unit 32 to the image memory 35 and a path for sending the image data read out of the memory 35 to the image record unit 34, on the basis of an instruction from the CPU circuit unit 37. The synthesizing circuit unit synthesizes the image data sent from the unit 32 and the image data read out of the memory 35.

The image record unit 34 transfers the image onto the recording sheet on the basis of a density signal of the image data sent from the image data selector 33.

The image memory 35 stores and reads the image data sent from the image data selector 33 at its designated position on the basis of the instruction from the CPU circuit unit 37 in a manner described later. Further, the memory 35 performs an image rotating process, an image synthesizing process on the memory, and the like.

The CPU circuit unit 37 is composed of a CPU, a ROM 38, a RAM 39, a various-timer control unit and the like. The CPU controls the image formation apparatus as a whole. The ROM 38 has stored therein a control program, an error process program and the like. The RAM 39 is used as a working area to execute various programs. The various programs which are shown in later-described flow charts of FIGS. 9 to 12, 14 and 15 and executed by the CPU have been stored in the ROM 38.

A console unit 36 is composed of various key groups, a display unit and the like. The key groups are used to instruct various image formation operations to the image process unit 32, e.g., the contents of the image edit, the number of copies and the like. The display unit displays the contents of the operations.

Figure 4:
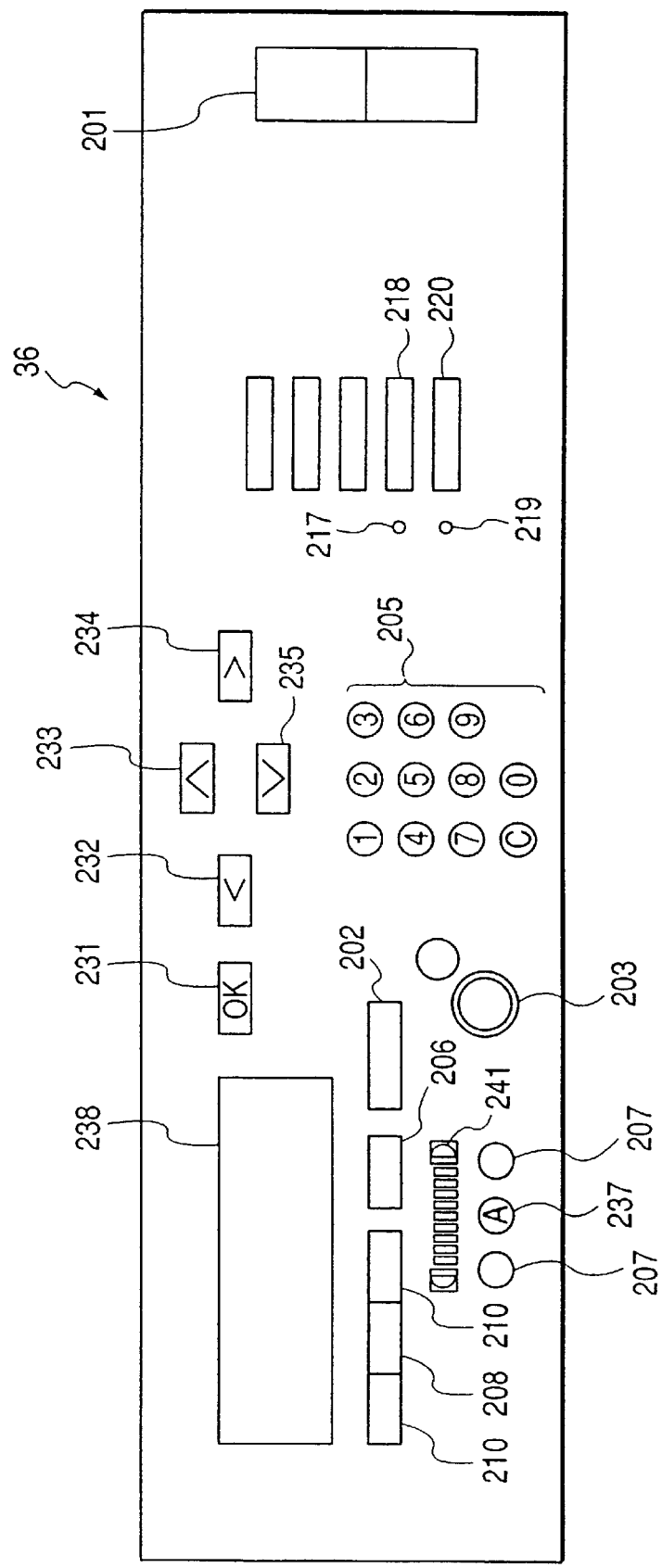
FIG. 4 is a view showing the configuration of a console unit 36 of the copy machine.

FIG. 4 is a view showing the configuration of the console unit 36 of the copy machine. As shown in the drawing, various keys (i.e., touch panel) and a liquid crystal display unit 238 (i.e., touch panel display) of a dot matrix are arranged on the unit 36. A state of the apparatus, the number of copies, magnification, the selected sheet and various operation screens are displayed on the unit 238, and the unit 238 is operated by using control keys 231 to 235.

A start key 203 is the key to start copying, and a return key 202 is the key to return a setting mode to a normal (or initial) state. A key group 205 is composed of a ten-key including "0" to "1" keys to input the number of copies, the zooming magnification and the like, and a clear key to clear such inputs. A density key 207 is the key to increase and decrease a density, and the density adjusted or controlled by using the key 207 is displayed on a display unit 241. The key 237 is the key to turn on and off an automatic density adjustment function, and also acts as the display unit to display an on/off state of the function. The key 206 is the key to select paper feed decks and an automatic sheet selection function, and such a selected state is displayed on the liquid crystal display unit 238.

A key 208 is the key to set the same-size copy, and a key 210 is the key to set the fixed-size reduction/enlargement copy. A state set by using the key 208 or 210 is displayed on the display unit 238. A book binding mode key 220 is the key to set a mode (book binding mode) for performing book binding in the state that the copied sheets are being folded in two. Procedure to set the book binding mode is displayed on the display unit 238 and a display unit 219.

Figure 5A:
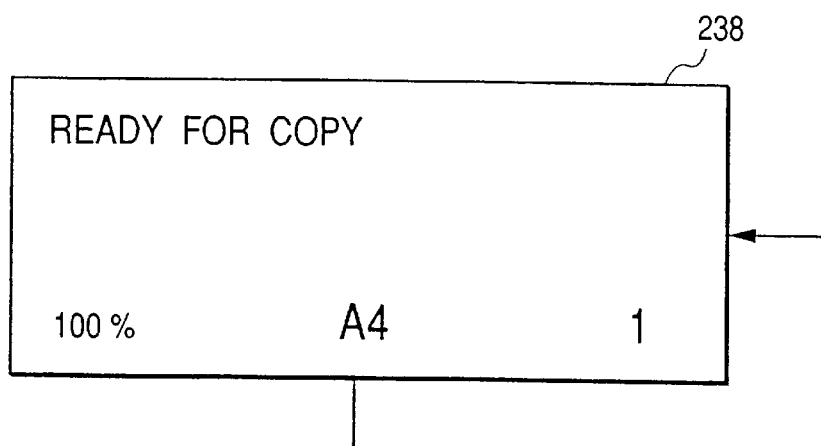
FIGS. 5A, 5B, 5C and 5D are views showing the procedure to set a cover sheet mode.
Figure 5B:
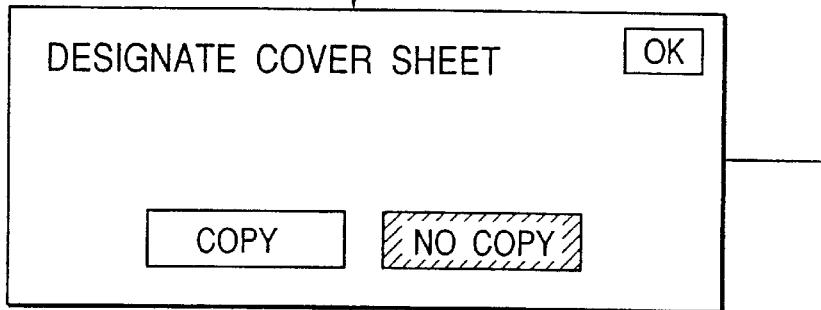
Figure 5C:
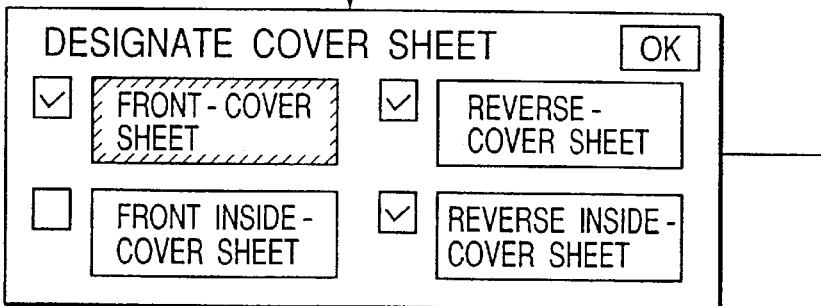

A key 218 is the key to set a cover sheet mode, and procedure to set the cover sheet mode is displayed on the display unit 238. FIGS. 5A to 5D are the views showing the procedure to set the cover sheet mode. When the key 218 is depressed, the displaying to set whether or not the copying is to be performed on the cover sheet is performed (FIG. 5B). In this case, if "NO COPY" is designated, the cover sheet mode not to perform the copying on the sheet to be used as the cover sheet is set, and the displaying state returns to a state shown in FIG. 5A. On the other hand, if "COPY" is designated, it is designated on which face of the sheet to be used as the cover sheet the copying is performed (FIG. 5C). When the designation terminates, the cover sheet mode to perform the copying on the sheet to be used as the cover sheet is set, and the displaying state returns to the state shown in FIG. 5A. The currently set state is displayed on a display unit 217.

Figure 5D:
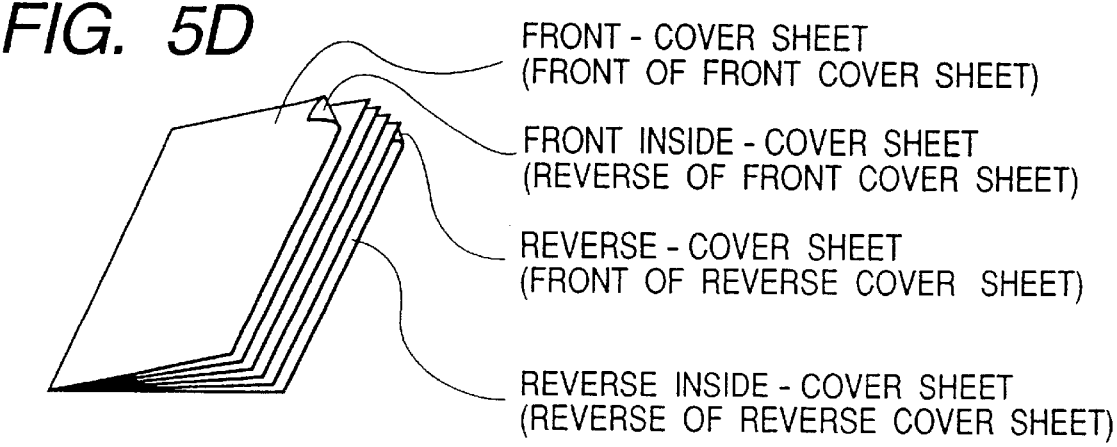

FIG. 5D represents which face of the sheet to be used as the cover sheet the setting in FIG. 5C indicates. That is, "FRONT—COVER SHEET" indicates the reverse of the front cover sheet, "FRONT INSIDE—COVER SHEET" indicates the reverse of the front cover sheet, "REVERSE—COVER SHEET" indicates the front of the reverse cover sheet, and "REVERSE INSIDE—COVER SHEET" indicates the reverse of the reverse cover sheet.

Figure 6A:
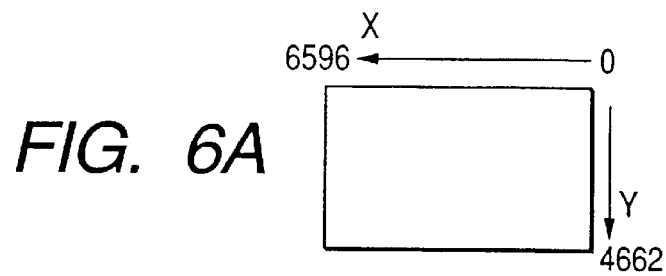
FIGS. 6A, 6B, 6C, 6D and 6E are views showing methods to store and read an original image.

Hereinafter, an operation of the copy machine of the above-described structure will be explained. FIGS. 6A to 6E are views showing methods to store and read the original image. FIG. 6A shows one storage capacity of the image memory. Namely, the image memory consists of longitudinal 4662 bits×lateral 6596 bits, and can store the image of A3 size. FIG. 7 is a view showing image storage areas in the image memory 35. That is, the image storage areas consist of one image layout memory (area) and image memories (areas) capable of storing the images of 100 sheets.

Initially, the method to store the original image in the image memory will be explained. In the present embodiment, a case where the original of A4 size put on the original mounting glass board 2 is stored in the image memory will be explained.

Figure 6B:
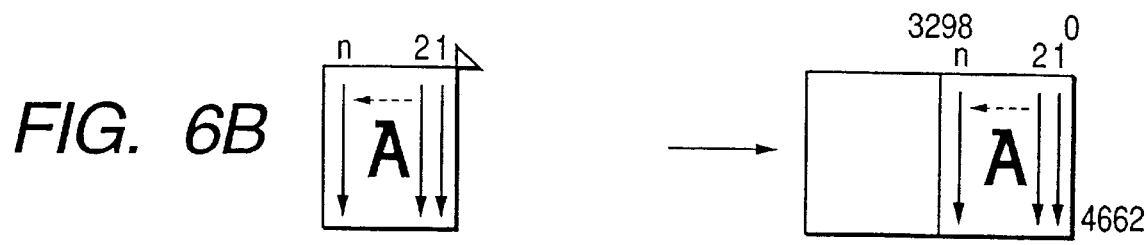

In FIG. 6B, the original is sequentially read or scanned in directions indicated by solid arrows.

Initially, a (0, 0) address is set as a start position, an X-direction counter is designated to be counted up, and a Y-direction counter is designated to be counted up. When a first line is read, the Y-direction counter is counted up, and the read image data is written in the memory in due order in a (0, 4661) address direction. Then, when a second line is read, the X-direction counter is counted up, the image data is written from a (1, 0) address in due order in a (1, 4661) address direction. By repeating the reading and writing in this manner, the image data is written up to a (3297, 4661) address.

Figure 6C:
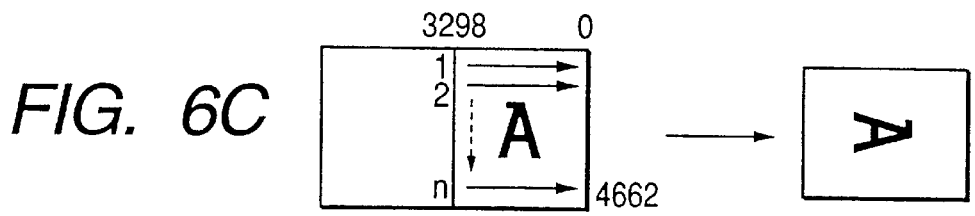

Subsequently, the process to read the image data written in the image memory will be explained with reference to FIGS. 6C and 6D. In FIG. 6C, a (3297, 0) address of a first line of the image data is set as a start position, the X-direction counter is designated to be counted down, and the Y-direction counter is designated to be counted up. As the X-direction counter is sequentially counted down, the written image data is read. Then, the Y-direction counter is counted up, and thus a second line is read from a (3297, 1) address in due order in a (0, 1) address direction.

Figure 6D:
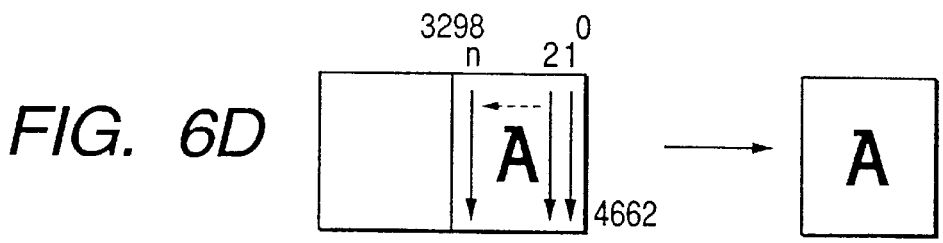

In FIG. 6D, a (0, 0) address of a first line is set as a start position, the X-direction counter is designated to be counted up, and the Y-direction counter is designated to be counted up. As the Y-direction counter is sequentially counted up in a (0, 4661) address direction, the image data is read. Then, the X-direction counter is counted up, a second line is read from a (1, 0) address in due order in a (1, 4661) address direction.

Therefore, by reading the image data in the method shown in FIG. 6C, the A4 original image can be rotated. On the other hand, by reading the image data in the method shown in FIG. 6D, the original image can be read without rotating it.

Figure 6E:
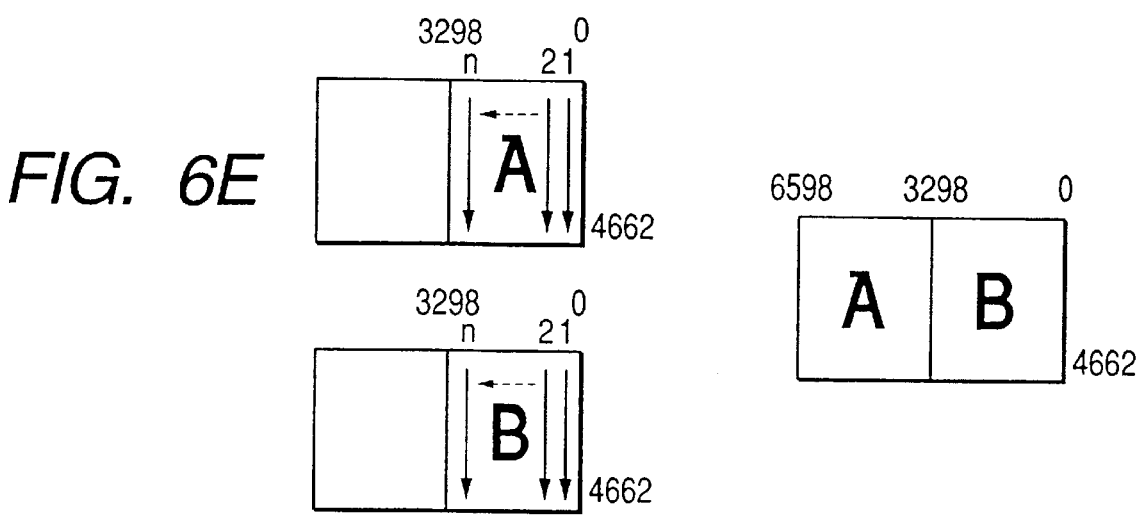

In FIG. 6E, the image data individually stored is read and the read image data is written at a desired position in an image layout memory, whereby the different original images can be synthesized in the memory.

Subsequently, a copy process in a book binding mode will be explained. FIGS. 8A to 8C are views showing the copy process in the book binding mode. FIG. 8A shows input originals 601 to 608 which are set to the original feed unit 1 in a state that these eight originals are being stacked. FIG. 8B shows a state that the sheets of the double-face images are bounded.

FIG. 8C shows page distribution on first and second sheets.

Figure 10:
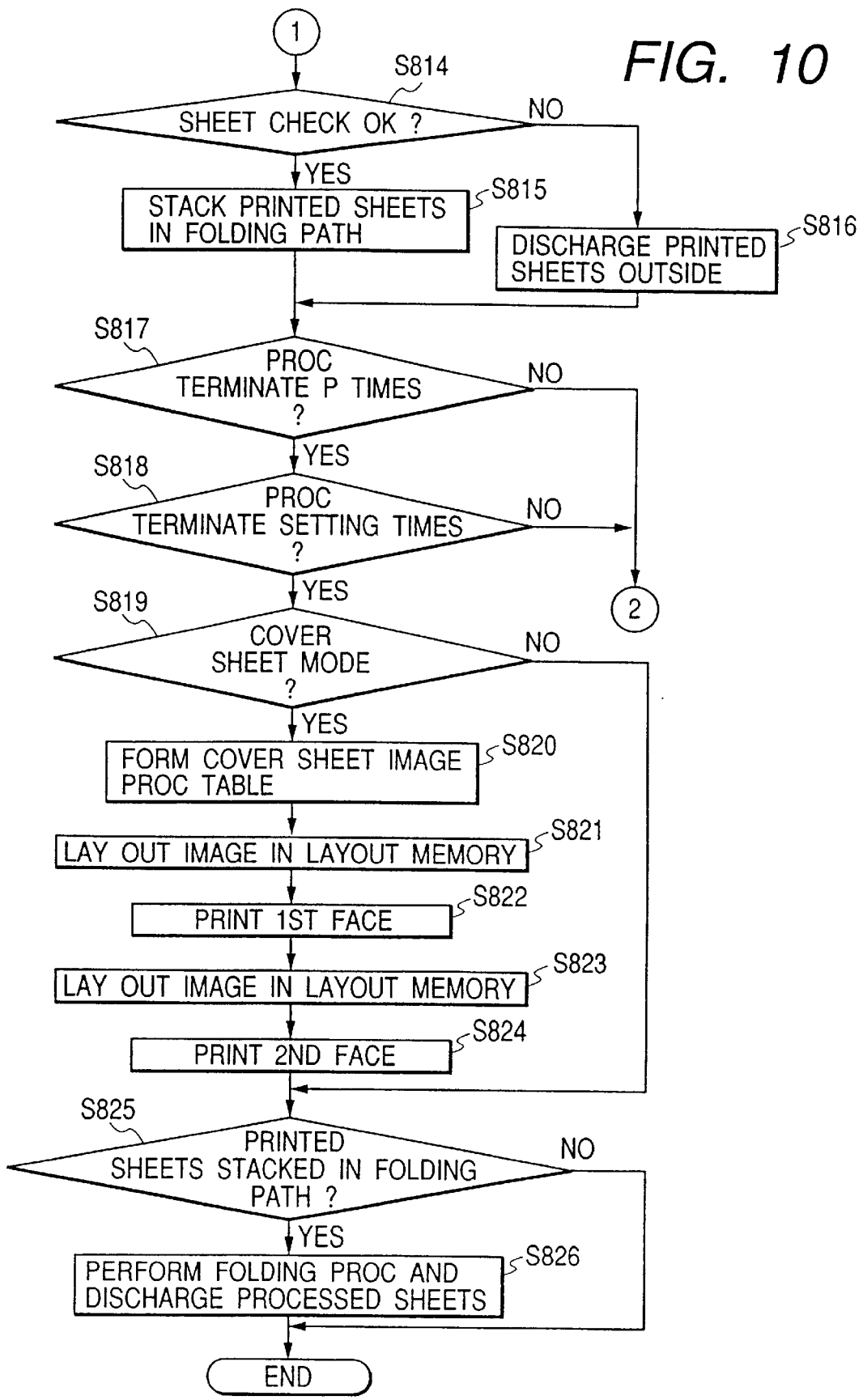
FIG. 10 is a flow chart showing the procedure of the copy process when the book binding mode and the cover sheet mode are designated.

FIGS. 9 and 10 are the flow charts showing the procedure to perform the copy process in a case where the book binding mode and the cover sheet mode are designated. Initially, the originals 601 to 608 shown in FIG. 8A are set to or put on the original feed unit 1. Further, in case of designating the cover sheet mode (see FIGS. 5A to 5D), the original to be copied on the cover sheet (i.e., cover sheet original) is set on the originals 601 to 608 already set to the unit 1 (see FIG. 17A). That is, not only the original to be copied on the front of the front cover sheet or the reverse of the front cover sheet, but also the original to be copied on the reverse of the reverse cover sheet or the front of the reverse cover sheet is set on the originals 601 to 608. In this case, it is assumed that these originals must be set in the order (from the top) of the front of the front cover sheet, the reverse of the front cover sheet, the reverse of the reverse cover sheet and the front of the reverse cover sheet. Thus, the user may only stack the originals for the cover sheets (including front cover sheet and reverse cover sheet) on a sheaf of the originals for the contents (text or body) sequentially stacked in due order. By doing so, the user can cause the image formation apparatus to execute the book binding mode to his satisfaction without any confusion.

Figure 17A:
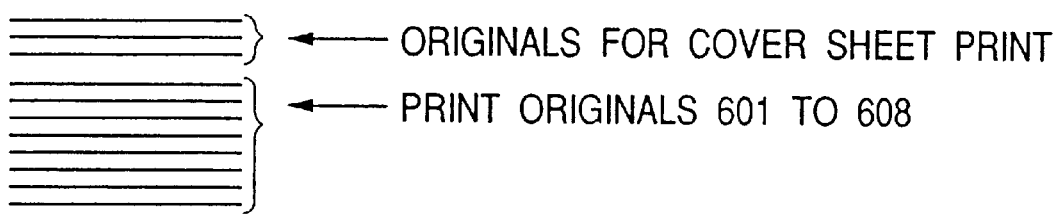
FIGS. 17A and 17B are views showing the arrangement of the original images for a cover sheet.

FIG. 17A shows the state of the originals when they are set in the manner shown in FIG. 5C. When the copy start key 203 is depressed in this state, the copy process starts.

Initially, the original size is detected by the original size detection sensor provided in the original feed unit 1 or the reflection sensors 22 and 23 (step S801). Then, the sheet is selected and the selected sheet is checked (step S802).

Figure 11:
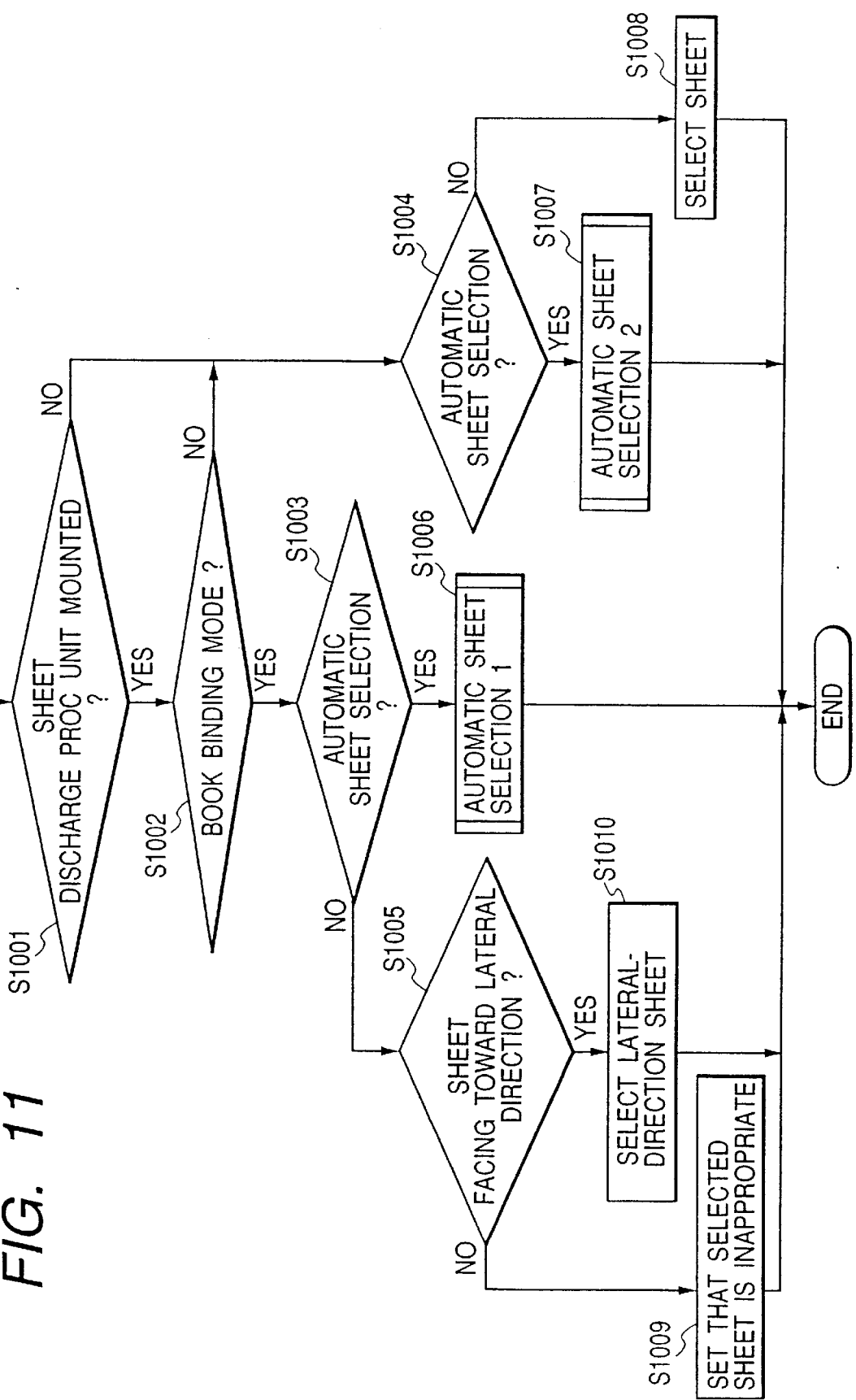
FIG. 11 is a flow chart showing the procedure of a sheet selection process.

FIG. 11 is the flow chart showing the procedure to perform a sheet selection process. It is first judged whether or not the sheet discharge process unit 100 having a folding mechanism is being mounted (step S1001). If not mounted, a process in a step S1004 is performed. On the other hand, if mounted, it is further judged whether or not the book binding mode is being designated (step S1002).

If not designated, the process in the step S1004 is performed. On the other hand, if designated, it is further judged whether or not automatic sheet selection is being designated (step S1003).

If designated, a process of automatic sheet selection 1 in a later-described step S1006 is performed. On the other hand, if not designated, it is judged whether or not the sheet designated by using the sheet selection key is the sheet facing laterally (i.e., sheet of which longer side extending along sheet discharge direction) (step S1005). If the sheet faces laterally, this sheet is selected (step S1010), and the process terminates. On the other hand, if the sheet does not faces laterally, it is set in a predetermined RAM area that the designated sheet is inappropriate (step S1009), and the process terminates.

In the step S1004, it is judged whether or not the automatic sheet selection is being designated. If designated, a process of automatic sheet selection 2 in a later-described step S1007 is performed. On the other hand, if not designated, a process in a step S1008 is performed. In this step S1008, the sheet designated by using the sheet selection key is selected, and then the process terminates.

Figure 12:
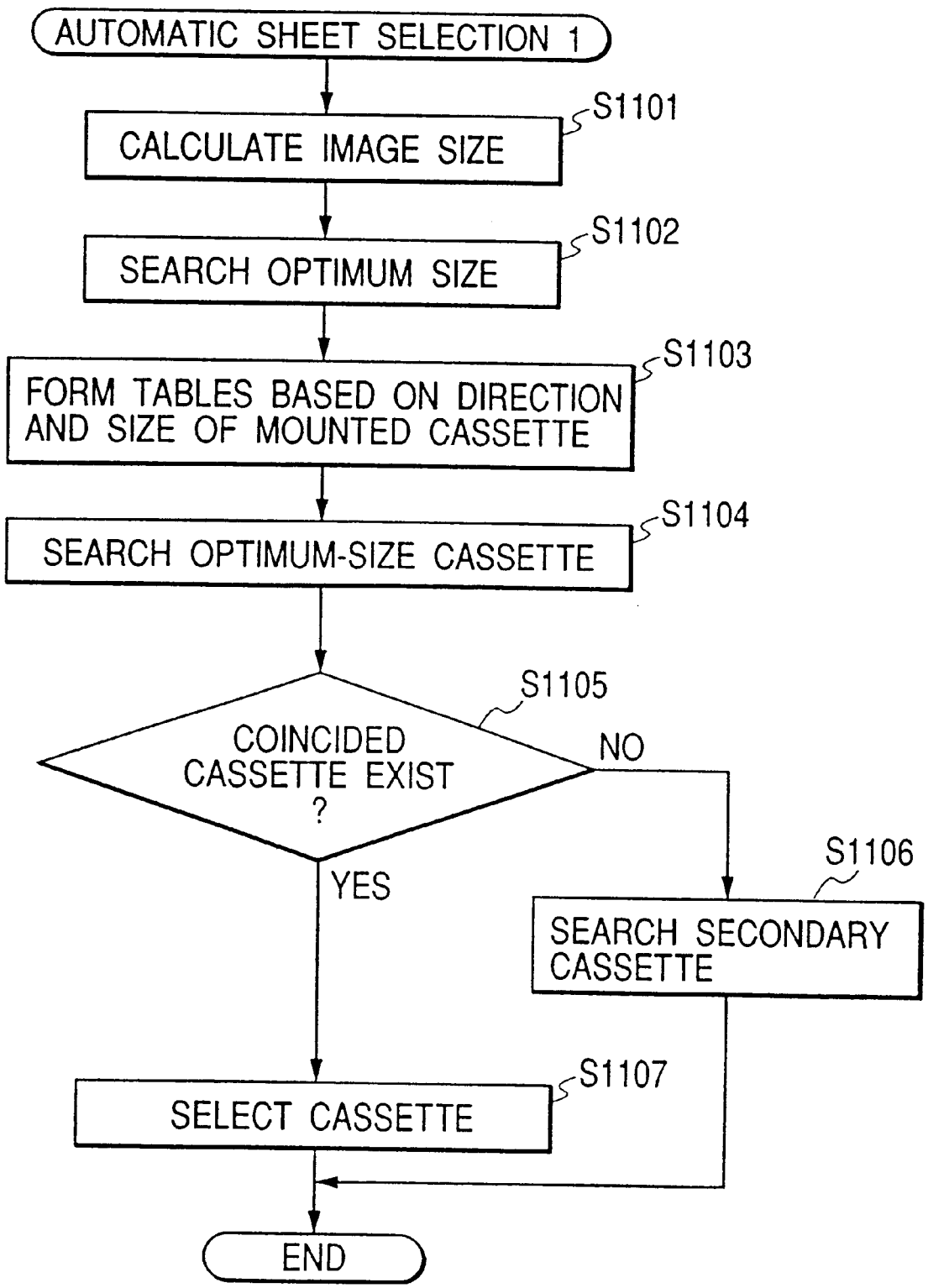
FIG. 12 is a flow chart showing the procedure of a process of automatic sheet selection 1 in a step S1006 shown in FIG. 11.

FIG. 12 is the flow chart showing the procedure to perform the process of automatic sheet selection 1 in the step S1006. In FIG. 12, an image size is initially calculated (step S1101). The image size is calculated based on the original size detected by the original size detection sensor or the reflection sensors 22 and 23, zooming data set by using the console unit, other mode, and the like. For example, in the book binding mode, the image size capable of containing the two faces of the originals is calculated by multiplying the detected original size by the magnification (zooming rate) and then doubling a shorter side of the obtained-size original.

Subsequently, the optimum sheet size is searched or retrieved (step S1102). FIGS. 13A and 13B are views respectively showing tables used to search the optimum sheet size. The search is performed by selecting the minimum-size sheet capable of containing the image size calculated in the step S1101, from among the laterally faced sheets arranged in the smaller order shown in FIG. 13A.

On the basis of the directions and the sizes of mounted sheet cassettes, a table in which the laterally faced sheets are arranged in the order of size and a table in which the longitudinally faced sheets are arranged in the order of size are respectively formed at predetermined areas in the RAM (step S1103).

Then, the cassette of which size coincides with the sheet size detected in the step S1102 is searched in the table formed in the step S1103 in which the laterally faced sheets are arranged in the order of size (step S1104), and it is detected whether or not there is the coincided-size cassette (step S1105). If YES in the step S1105, the coincided cassette is selected (step S1107), and the process terminates. On the other hand, if NO in the step S1105, the secondary subject (i.e., cassette) is selected (step S1106). As the secondary cassette, the smallest-size cassette (sheet) capable of containing the sheet size searched in the step S1102 is searched in the table formed in the step S1103. In this case, if there is no cassette to be selected, the remaining maximum-size cassette is selected, and the process terminates.

Figure 14:
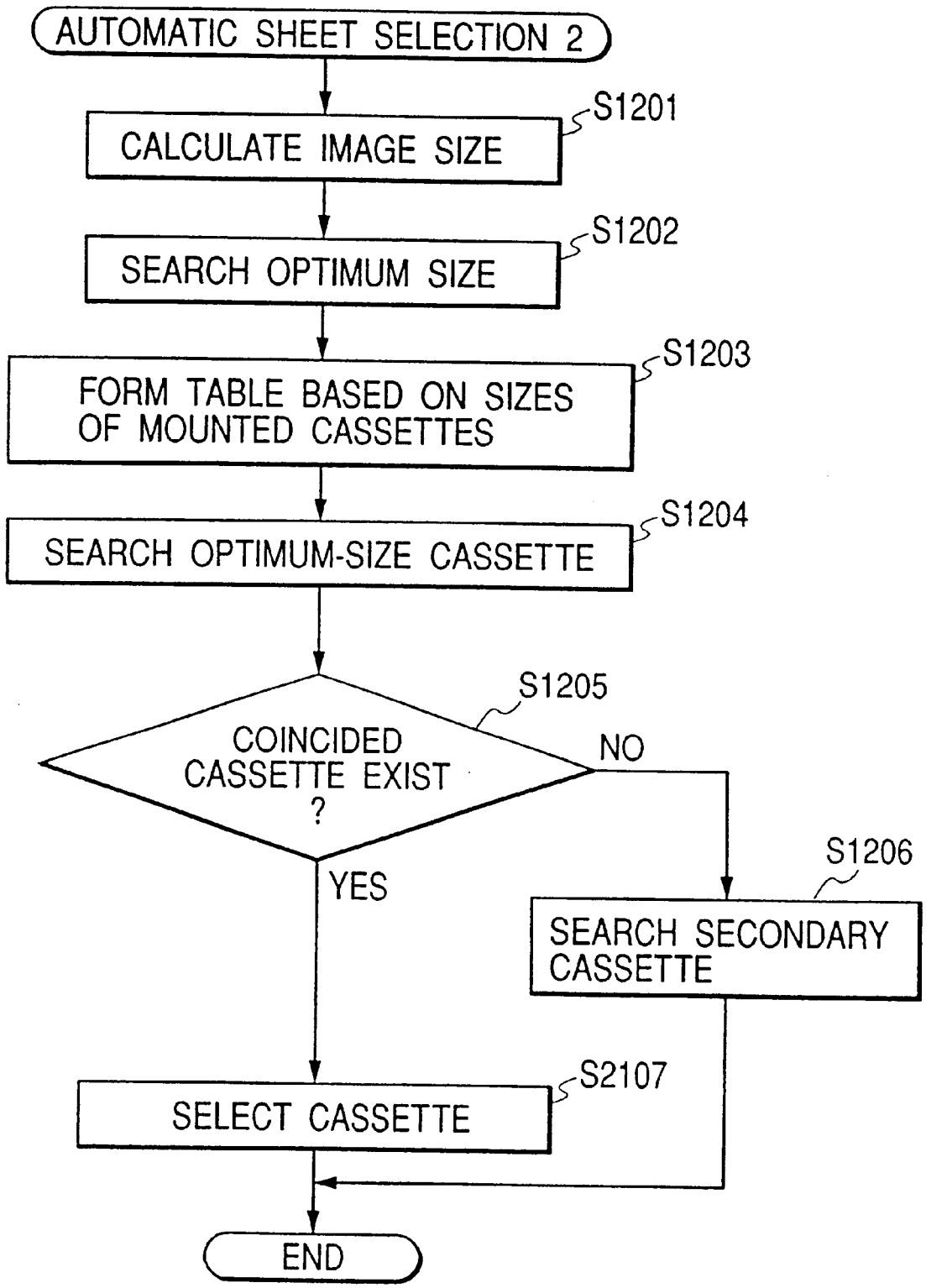
FIG. 14 is a flow chart showing the procedure of a process of automatic sheet selection 2 in a step S1007 shown in FIG. 11.

FIG. 14 is the flow chart showing the procedure to perform the process of automatic sheet selection 2 in the step S1007. Initially, the image size is calculated (step S1201). The image size is calculated based on the original size detected by the original size detection sensor or the reflection sensors 22 and 23, the zooming data set by using the console unit, other mode, and the like.

Subsequently, the optimum sheet size is searched or retrieved (step S1202). The search is performed by selecting the minimum-size sheet capable of containing the image size calculated in the step S1201, from among the longitudinally faced sheet and the laterally faced sheets arranged in the smaller order shown in FIG. 13B. The mounted sheet cassettes are arranged in the order of size to form the table at a predetermined area in the RAM (step S1203).

Then, the cassette of which size coincides with the sheet size detected in the step S1202 is searched in the table formed in the step S1203 in which the sheet cassettes are arranged in the order of size (step S1204), and it is detected whether or not there is the coincided-size cassette (step S1205). If YES in the step S1205, the coincided cassette is selected (step S1207), and the process terminates.

On the other hand, if NO in the step S1205, the secondary subject (i.e., sheet cassette) is selected (step S1206). As the secondary sheet cassette, the smallest-size cassette (sheet) capable of containing the sheet size searched in the step S1202 is searched in the table formed in the step S1203. In this case, if there is no sheet cassette to be selected, the remaining maximum-size cassette is selected, and the process terminates.

Thus, the sheet selection process in the step S802 in FIG. 9 terminates. Subsequently, as a result of the process in the step S802, it is checked whether or not the selected sheet is inappropriate, the optimum-size sheet is being selected, or the like (step S803).

If a satisfactory result can be obtained in the sheet check, the flow advances to a process in a step S806. On the other hand, if such the result can not be obtained, a message to notify that the sheet is inappropriate is displayed on the liquid crystal display unit 238 of the console unit (step S804), and the flow waits for the start key inputting to again start the process (step S805). When the start key inputting is performed, the flow advances to the process in the step S806.

In the step S806, the originals put upward on the original feed unit 1 are carried or fed one by one from the top in sequence to the original mounting glass board 2, the images of the carried originals are read by the image sensor 9, and the read images are sequentially stored in the image memory 35 shown in FIG. 7. Such the storing is performed from the image memory 1 in sequence in FIG. 7. Simultaneously, the number N of the originals is counted.

In a case where the cover sheet mode is being set and the setting to perform the copying on the cover sheet is being performed, the number N of the originals is corrected by subtracting the number C (maximum 4) of the cover sheet originals to be copied (i.e., originals to be copied on cover sheet) from the actually counted number N of the originals, by using an expression (1) (step S807). It should be noted that the number C of the cover sheet originals is equal to the number of checks (✓) designated on a screen shown in FIG. 5C.

$$N=N-(\text{the number C of the cover sheet originals to be copied}) \quad (1)$$

Then the number P of the sheets to be outputted is calculated from the number N of the originals by using an expression (2) (step S808).

$$P=QOUT[(N+3)/4] \quad (2)$$

where $QOUT[X]$ represents an integral quotient of X, and this integral quotient is the integral value which is obtained by cutting off numerical values smaller than a decimal point of a result of such a division process.

Figure 15:
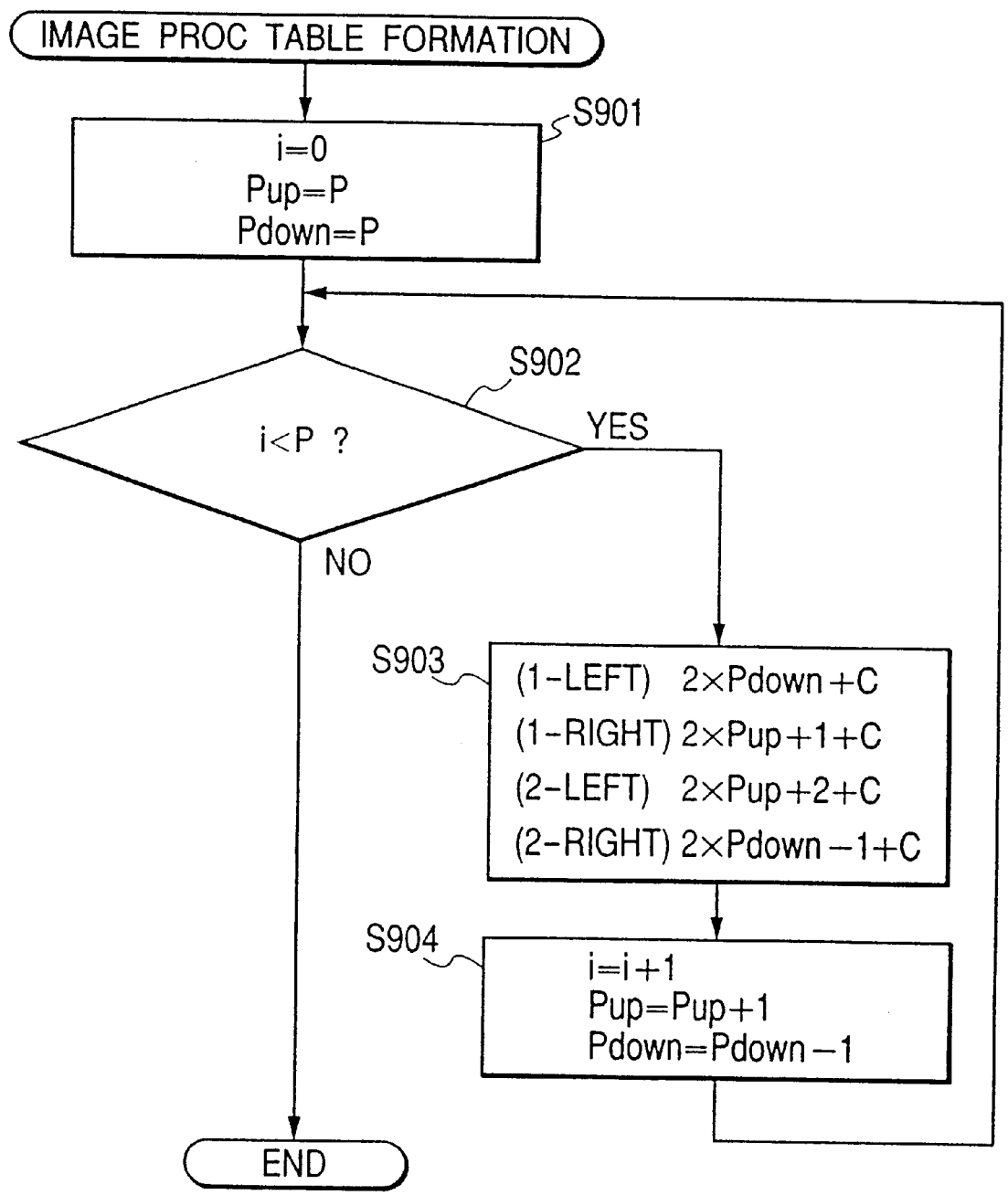
FIG. 15 is a flow chart showing the procedure to form an image process table in a step S809 shown in FIG. 9.

Subsequently, the image reading order is calculated to form an image process table representing the image reading order (step S809). FIG. 15 is the flow chart showing the procedure to form the image process table in the step S809. Initially, a counter i is set to be "0", and the number P of the output sheets obtained in the step S808 is set to a counters Pup and Pdown (step S901).

Then, the number P of the output sheets is compared with the counter i (step S902). If a result of the comparison (i<P)

is true, the flow advances to a step S903. On the other hand, if the result is false, the process terminates. In the step S903, calculation is performed according to an expression (3) to write in due order calculated results in the image process table representing the image reading order. FIG. 16A is the view showing the image process table in a case where there is no cover sheet or no copy is performed on the cover sheet. FIG. 16B is the view showing the image process table in a case where there are three originals to be copied on the cover sheets as in the setting shown in FIG. 5C.

$$\text{first face-left} = 2 \times Pdown + C$$
$$\text{first face-right} = 2 \times Pup + 1 + C$$
$$\text{second face-left} = 2 \times Pup + 2 + C$$
$$\text{second face-right} = 2 \times Pdown - 1 + C \quad (3)$$

where C represents the number of the cover sheet originals to be copied.

Subsequently, the value "1" is added to the counter i, the value "1" is added to the counter Pup, and the value "1" is subtracted from the counter Pdown (step S904). Then, the flow again returns to the process in the step S902 to repeat the processes in the steps S902 and the follower to form the image process tables shown in FIGS. 16A and 16B.

After then, the images stored in the image memory 35 are laid out in the image layout memory within the memory 35 according to the order indicated by the image process tables shown in FIGS. 16A and 16B (step S810). In the example of FIG. 16A, the fourth image is firstly laid out in the above manner such that this image is located on the left side of the image layout memory, and the fifth image is laid out such that this image is located on the right side of the image layout memory. Then, the image in the image layout memory is printed according to the print starting of a first face (step S811). Like the step S810, the next image is expanded in the image layout memory (step S812), and the next image expanded is similarly printed on the reverse of the sheet already subjected to the printing in the step S811 (step S813). Then, like the step S803, the sheet is checked (step S814). If OK in the step S814, the sheet of which both the faces were subjected to the printing is put on a stack unit 110 within the sheet discharge process unit 100 in a case where the unit 100 is being mounted (step S815). On the other hand, if not OK in the step S814, the sheet is not carried or fed to the stack unit 110 but is discharged outside (step S816).

Subsequently, it is judged whether or not the above-described processes in the steps S810 and the follower are performed plural times as many as the number P of the output sheets (step S817). If the processes do not terminate, the processes in the step S810 and the follower are repeated. On the other hand, if the processes terminate, it is further judged whether or not the processes of the number of copies designated by the console unit terminate (step S818). If not terminate, the processes in the step S810 and the follower are repeated. Then, if terminate, the flow advances to a process in a step S819.

In the step S819, it is judged whether or not the cover sheet mode is being set. If not being set, processes in a step S825 and the follower are performed. On the other hand, if being set, the cover sheet image process table is formed (step S820).

Figure 17B:
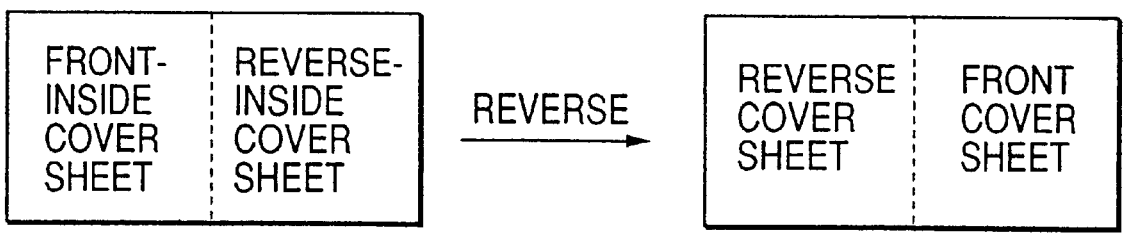

FIG. 17B is a view showing the arrangement of the original images for the cover sheets. FIGS. 18A and 18B are views showing the cover sheet image process table. In FIG. 18B, numerals "1", "2", "3" and "4" represent page information of the read originals images for the cover sheets. On the basis of the mode shown in FIG. 18A and designated by the console unit, the page information of the print image shown in FIG. 18B is read, and a layout process for the image is performed (step S821). Numeral "0" in FIG. 18B represents that there is no image to be laid out. The image layout processes on the first and second faces are performed in the steps S821 and S823, respectively. In these cases, the images stored in the image memory 35 are laid out in the image layout memory within the memory 35 according to the cover sheet image process table shown in FIGS. 18A and 18B (step S821). How to lay out the image is the same as that in the process shown in the step S810.

The image in the image layout memory is printed according to the print starting of the first face (step S822). Like the step S821, the next image is expanded in the image layout memory (step S823), and the next image is similarly printed on the reverse of the sheet already subjected to the printing in the step S822 (step S824).

When the printing terminates, the processes in the step S825 the follower are performed. In the step S825, it is judged whether or not the sheets are stacked in the folding path 104. If YES in the step S825, the folding process is performed (step S826), and then the sheets are discharged outside. On the other hand, if NO in the step S825, the process terminates.

By performing the above processes, the book binding layout which is added with the cover sheets can be realized.

It should be noted that the present invention can be applied to a system consisting of plural equipments or can be also applied to an apparatus containing one equipment. Further, it will be obviously understood that the present invention can be applied to such a case as the invention is achieved by supplying a program to the system or the apparatus. In this case, when the system or the apparatus reads a storage medium in which a program represented by a software to achieve the present invention has been stored, the system or the apparatus can derive the effect of the present invention.

In the above embodiment, although the ROM has been used as the storage medium, the present invention is not limited to this. For example, a floppy disk, a hard disk, an optical disk, a magneto-optical disk, a CD-ROM, a CD-R, a DVD, a magnetic tape, a nonvolatile memory card or the like can be used as the storage medium.

What is claimed is:

1. An image formation apparatus comprising:

a reader for sequentially reading plural originals including an original for a front cover sheet;

a memory for storing plural original images read by said reader;

an image formation unit for reading the original images of four pages from said memory, and forming the images of two pages on each of front and reverse faces of a sheet;

a console unit for designating to form an image for the front cover sheet; and a controller for controlling said image formation unit to read the image for the front cover sheet, to form the image for the front cover sheet on a first face of a cover sheet and no image on a second face of the cover sheet, and to form the images of two pages on each of front and reverse faces of a sheet different from the cover sheet, in accordance with that an image formation of the image for the front cover sheet on the cover sheet is designated by said console unit.

2. An apparatus according to claim 1, wherein said controller controls the reading of the images from said memory such that when the plural sheets on which the images have been respectively formed are together folded in two in a state that the plural sheets are being stacked, the images on the respective sheets are arranged in the order of page.

3. An apparatus according to claim 2, further comprising:
a binding processor for performing a binding process on a central portion of the sheet in the state that the plural sheets on which the images have been respectively formed by said image formation means are being stacked; and
a folding processor for folding the sheets in two with use of the central portion of the sheets binding processed by said binding processor.

4. An apparatus according to claim 2, wherein said console unit designates the sheet face and a position on which the original image for the cover sheet is to be formed, and
wherein said controller recognizes the number of the originals for the cover sheet according to the designation by said console unit, controls the reading of the original images from said memory based on the number of the originals obtained by subtracting the number of the originals for the cover sheets from the number of the read originals, and controls the reading of the original images from said memory according to the designation by said console unit.

5. An apparatus according to claim 1, further comprising:
a tray for loading thereon a sheaf of the originals including the original for the cover sheet; and
a feeder for feeding the originals from said tray one by one,
wherein said reader reads the original fed by said feeder.

6. An apparatus according to claim 5, wherein said tray loads the sheaf of the originals such that the sheaf of the originals for the cover sheet is stacked on the sheaf of the originals to be copied, and said feeder feeds the originals from the top of the sheaf of the originals loaded on said tray in due order.

7. An image formation apparatus comprising:
read means for sequentially reading plural originals including the original for a cover sheet;
storage means for storing plural original images read and obtained by said read means;
image formation means for reading the original images of four pages from said storage means, and forms the images of two pages on each of front and reverse faces of a sheet;
setting means for performing setting to form the image on the cover sheet; and
control means for controlling, according as the setting to form the image on the cover sheet was performed by said setting means, the reading of the images from said storage means such that the original image for the cover sheet is formed on the sheet different from the sheet on which the original image not for the cover sheet is formed,
wherein said control means controls the reading of the images from said storage means such that when the plural sheets on which the images have been respectively formed are together folded in two in a state that the plural sheets are being stacked, and a folded portion of the sheets are bounded, the images on the respective sheets are arranged in the order of page.

8. An apparatus according to claim 7, further comprising:
binding process means for performing a binding process on a central portion of the sheets in the state that the plural sheets on which the images have been respectively formed by said image formation means are being stacked; and
folding process means for folding the sheets in two with use of the central portion of the sheets binding processed by said binding process means as a fold.

9. An apparatus according to claim 7, further comprising second setting means for setting the sheet face and a position on which the original image for the cover sheet is to be formed, and
wherein said control means recognizes the number of the originals for the cover sheets according to the setting by said second setting means, controls the reading of the original images from said storage means based on the number of the originals obtained by subtracting the number of the originals for the cover sheets from the number o the read originals, and controls the reading of the original images from said storage means according to the setting by said second setting means.

10. An apparatus according to claim 7, further comprising:
loading means for loading thereon a sheaf of the originals including the original for the cover sheet; and
feed means for feeding the originals from said loading means one by one,
wherein said read means reads the original fed by said feed means.

11. An apparatus according to claim 10, wherein said loading means loads the sheaf of the originals such that the sheaf of the originals for the cover sheets is stacked on the sheaf of the originals to be copied, and said feed means feeds the originals from the top of the sheaf of the originals loaded on said loading means in due order.

* * * * *